United States Patent
Lin et al.

(10) Patent No.: US 8,686,700 B2
(45) Date of Patent: Apr. 1, 2014

(54) BOOST TYPE POWER CONVERTING APPARATUS WITH PROTECTION CIRCUIT

(75) Inventors: Chiu-Yuan Lin, Taipei (TW); Chien-Pang Hung, Taipei (TW)

(73) Assignee: Beyond Innovation Technology Co., Ltd., Taipei (TW)

( * ) Notice: Subject to any disclaimer, the term of this patent is extended or adjusted under 35 U.S.C. 154(b) by 458 days.

(21) Appl. No.: 12/908,862

(22) Filed: Oct. 20, 2010

(65) Prior Publication Data
US 2011/0187337 A1 Aug. 4, 2011

(30) Foreign Application Priority Data
Feb. 3, 2010 (TW) ................................ 99103184 A

(51) Int. Cl.
*G05F 1/00* (2006.01)
*H02M 3/156* (2006.01)

(52) U.S. Cl.
USPC ............................ 323/282; 323/271; 323/351

(58) Field of Classification Search
USPC ........................... 323/222, 271, 282, 344, 351
See application file for complete search history.

(56) References Cited

U.S. PATENT DOCUMENTS

| | | | | |
|---|---|---|---|---|
| 5,574,357 | A * | 11/1996 | Otake et al. ................... | 323/222 |
| 5,726,845 | A * | 3/1998 | Ho ................................. | 361/86 |
| 6,185,082 | B1 * | 2/2001 | Yang ............................. | 361/90 |
| 7,098,605 | B2 * | 8/2006 | Oh ............................... | 315/291 |
| 7,417,382 | B2 * | 8/2008 | Lin .............................. | 315/225 |
| 7,835,119 | B2 * | 11/2010 | Florence et al. ............... | 361/18 |
| 7,898,227 | B2 * | 3/2011 | Huang et al. .................. | 323/222 |
| 2005/0285579 | A1 * | 12/2005 | Yasukouchi et al. .......... | 323/282 |
| 2006/0022648 | A1 * | 2/2006 | Ben-Yaakov et al. ......... | 323/222 |
| 2008/0079405 | A1 * | 4/2008 | Shimizu ........................ | 323/282 |
| 2010/0127678 | A1 * | 5/2010 | Inatomi et al. ................ | 323/282 |

FOREIGN PATENT DOCUMENTS

| | | |
|---|---|---|
| CN | 201113523 | 9/2008 |
| CN | 101282078 | 10/2008 |
| CN | 101414210 | 4/2009 |
| CN | 101494417 | 7/2009 |
| TW | 200935711 | 8/2009 |
| TW | I315930 | 10/2009 |
| TW | 201004143 | 1/2010 |

OTHER PUBLICATIONS

"Office Action of Taiwan Counterpart Application", issued on Apr. 22, 2013, p. 1-p. 4.
"First Office Action of China Counterpart Application", issued on Mar. 18, 2013, p. 1-p. 14.
"Second Office Action of China Counterpart Application", issued on Jul. 23, 2013, p. 1-p. 15.

* cited by examiner

*Primary Examiner* — Adolf Berhane
*Assistant Examiner* — Emily P Pham
(74) *Attorney, Agent, or Firm* — Jianq Chyun IP Office

(57) ABSTRACT

A boost type power converting apparatus is disclosed. The boost type power converting apparatus includes a boost type power converting circuit and a protection circuit. The boost type power converting circuit receives an input voltage and generates an output signal at an output terminal thereof according to the input voltage, and outputs the output signal to a load. The protection circuit is coupled between the boost type power converting circuit and the load in serial to form an electrical loop, and turns on or off the electrical loop according to the output signal.

9 Claims, 10 Drawing Sheets

US 8,686,700 B2

BOOST TYPE POWER CONVERTING APPARATUS WITH PROTECTION CIRCUIT

CROSS-REFERENCE TO RELATED APPLICATION

This application claims the priority benefit of Taiwan application serial no. 99103184, filed on Feb. 3, 2010. The entirety of the above-mentioned patent application is hereby incorporated by reference herein and made a part of this specification.

BACKGROUND

1. Field of the Invention

The invention relates to a boost type power converting apparatus. Particularly, the invention relates to a short-circuit protection apparatus of a boost type power converting apparatus.

2. Description of Related Art

Referring to FIG. 1, FIG. 1 is a diagram illustrating a conventional boost type power converting apparatus 100. The boost type power converting apparatus 100 receives an input voltage Vin, and provides an output signal Out1 to a load 130. In the boost type power converting apparatus 100, a controller 101 provides a control signal to turn on or off a switch SW1. By turning on or off the switch SW1, an inductor L1 and a capacitor C1 can store energy, so as to generate the output signal Out1.

In the conventional boost type power converting apparatus 100, a short-circuit phenomenon is usually occurred due to a careless operation of a user or damage of the load 130 (for example, a light-emitting diode) caused by a long time operation. Since such short-circuit phenomenon may cause a damage of the power converting apparatus 100, the load 130 or other peripheral devices, a fuse Fuse is disposed on a path through which the power converting apparatus 100 receives the input voltage Vin. Therefore, when the short-circuit phenomenon is occurred, the fuse is first blown, so as to avoid damaging the power converting apparatus 100, the load 130 or the other peripheral devices. However, a main shortage of using the fuse Fuse for protection is that when the trouble that causes the short-circuit phenomenon is cleared, the power converting apparatus 100 has to be sent back to the factory for replacing the fuse, which is inconvenient in utilization.

SUMMARY OF THE INVENTION

The invention is directed to a boost type power converting apparatus, when a short-circuit phenomenon is occurred at a load end, an electrical loop formed between the boost type power converting apparatus and the load can be effectively turned off.

The invention provides a boost type power converting apparatus including a boost type power converting circuit and a protection circuit. The boost type power converting circuit has an output terminal. The boost type power converting circuit receives an input voltage, and accordingly generates an output signal at the output terminal and outputs the output signal to a load. The protection circuit is coupled between the boost type power converting circuit and the load to form an electrical loop, and turns on or off the electrical loop according to the output signal.

In an embodiment of the invention, the protection circuit includes a high-end detecting circuit and a switch module. The high-end detecting circuit is coupled to the load, and is used for receiving the output signal, and accordingly generating a control signal according to the output signal. The switch module is coupled between the high-end detecting circuit and the output terminal of the boost type power converting circuit, and is turned on or off according to the control signal.

In an embodiment of the invention, the protection circuit includes a high-end detecting circuit and a switch module. The high-end detecting circuit is coupled to the load and the boost type power converting circuit, and is used for receiving the output signal, and accordingly generating a stop signal according to the output signal. The high-end detecting circuit transmits the stop signal to the boost type power converting circuit to disable a pulse-width modulation (PWM) signal generated in the boost type power converting circuit. The switch module is coupled between the load and a ground voltage, and is coupled to the boost type power converting circuit. The switch module receives the PWM signal and is turned on or off according to the PWM signal.

In an embodiment of the invention, the protection circuit includes a low-end detecting circuit and a switch module. The low-end detecting circuit is coupled to the load and a ground voltage, and is used for receiving the output signal passing through the load, and accordingly generating a stop signal according to the output signal. The low-end detecting circuit transmits the stop signal to the boost type power converting circuit to disable a pulse-width modulation (PWM) signal generated in the boost type power converting circuit. The switch module is coupled between the boost type power converting circuit and the load, and is turned on or off according to the PWM signal.

In an embodiment of the invention, the protection circuit includes a low-end detecting circuit and a switch module. The low-end detecting circuit is coupled to the load and a ground voltage. The low-end detecting circuit receives the output signal passing through the load, and accordingly generates a stop signal according to the output signal. The low-end detecting circuit transmits the stop signal to the boost type power converting circuit to disable a pulse-width modulation (PWM) signal generated in the boost type power converting circuit. The switch module is coupled between the load and a ground voltage, and is turned on or off according to the PWM signal.

According to the above descriptions, the protection circuit capable of detecting a short-circuit state of a load end (the output terminal of the boost type power converting circuit) is connected between the boost type power converting circuit and the load, and when the short-circuit phenomenon is occurred at the load end, the electrical loop formed between the boost type power converting circuit and the load is cut off, so as to avoid damaging the boost type power converting circuit and the load.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
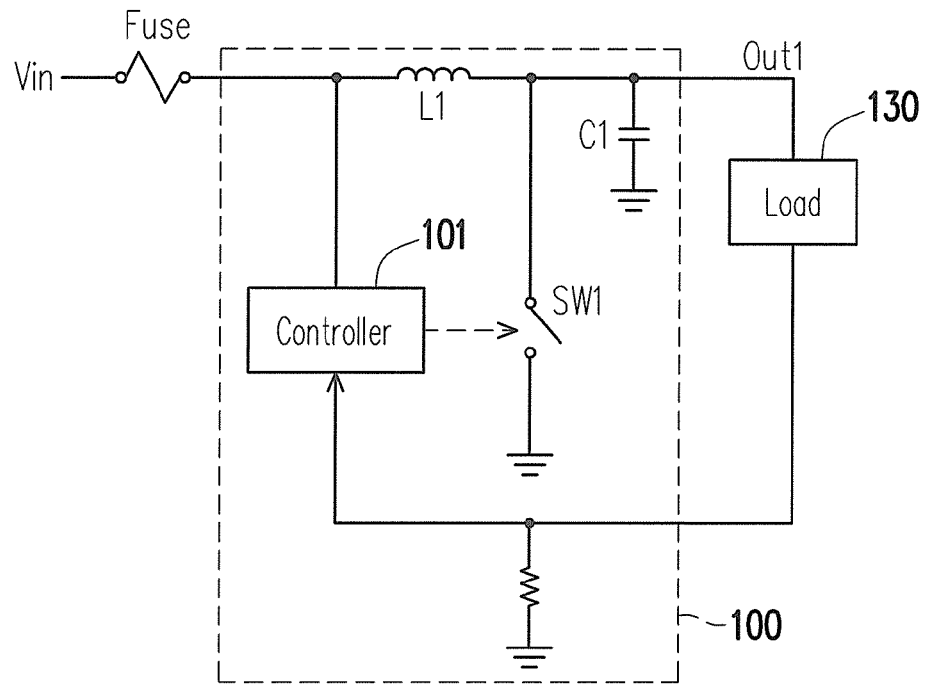
FIG. 1 is a diagram illustrating a conventional boost type power converting apparatus 100.

Reference will now be made in detail to the present preferred embodiments of the invention, examples of which are illustrated in the accompanying drawings. Wherever possible, the same reference numbers are used in the drawings and the description to refer to the same or like parts.

Figure 2:
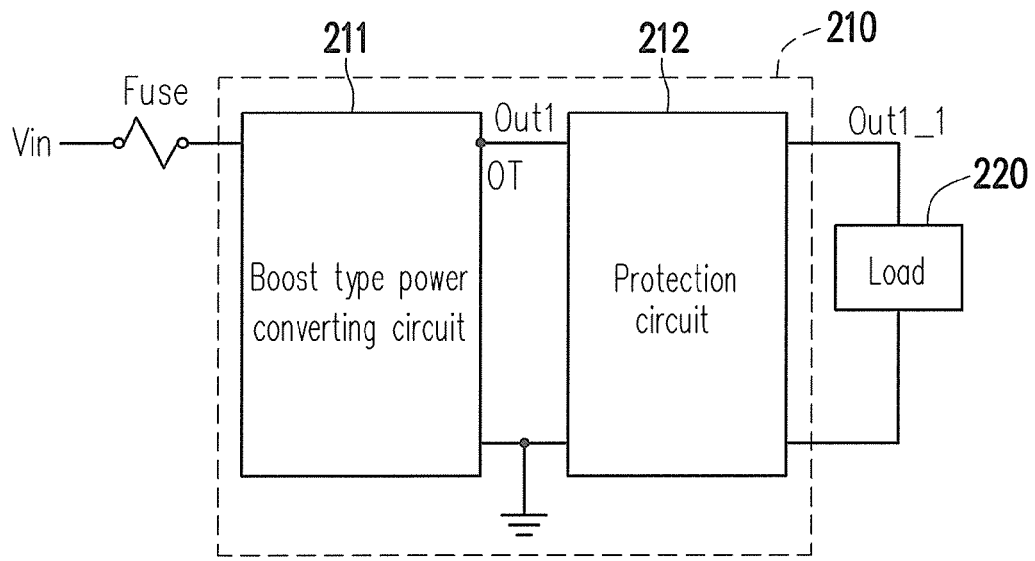
FIG. 2 is a schematic diagram of a boost type power converting apparatus 210 according to an embodiment of the invention.

Referring to FIG. 2, FIG. 2 is a schematic diagram of a boost type power converting apparatus 210 according to an embodiment of the invention. The boost type power converting apparatus 210 receives an input voltage Vin through a fuse Fuse, and generates an output signal Out1_1 to a load 220. The boost type power converting apparatus 210 includes a boost type power converting circuit 211 and a protection circuit 212. The boost type power converting circuit 211 has an output terminal OT. The boost type power converting circuit 211 receives the input voltage Vin, and accordingly generates an output signal Out1 at the output terminal OT, and the output signal Out1_1 is output to the load 220 through the protection circuit 212. The protection circuit 212 is coupled between the boost type power converting circuit 211 and the load 220 in serial to form an electrical loop. The protection circuit 212 turns on or off the electrical loop according to the output signal Out1.

In brief, when a short-circuit phenomenon is occurred at a load end connecting the load 220, a voltage level of the output signal Out1_1 (which is, for example, a voltage format) is sharply decreased due to the short-circuit phenomenon. Now, the protection circuit 212 detects that the voltage level of the output signal Out1_1 is sharply decreased, and immediately cuts off the electrical loop formed between the boost type power converting circuit 211 and the load 220. Namely, when the short-circuit phenomenon is occurred at the load end, the boost type power converting circuit 211 stops providing the output signal Out1_1 due to that the electrical loop is cut off. In this way, occurrence of a transient high-current in the electrical loop is avoided, so as to effectively protect the boost type power converting circuit 211, the load 220 or peripheral circuits connected thereto (not shown).

More importantly, the protection circuit 212 can be designed to cut off the electrical loop and the protection circuit 212 further latches the cut-off state when the short-circuit phenomenon is detected. In this way, before the trouble that causes the short-circuit phenomenon is effectively cleared, the electrical loop cannot be turned on to cause another risk of device damage. More importantly, after the trouble that causes the short-circuit phenomenon is cleared, as long as the boost type power converting apparatus 210 is turned off and rebooted, the protection circuit 212 can release the cut-off state of the electrical loop, so that the electrical loop formed between the boost type power converting circuit 211 and the load 220 is turned on for normal operation. Therefore, replacement of the fuse Fuse is unnecessary.

Figure 3A:
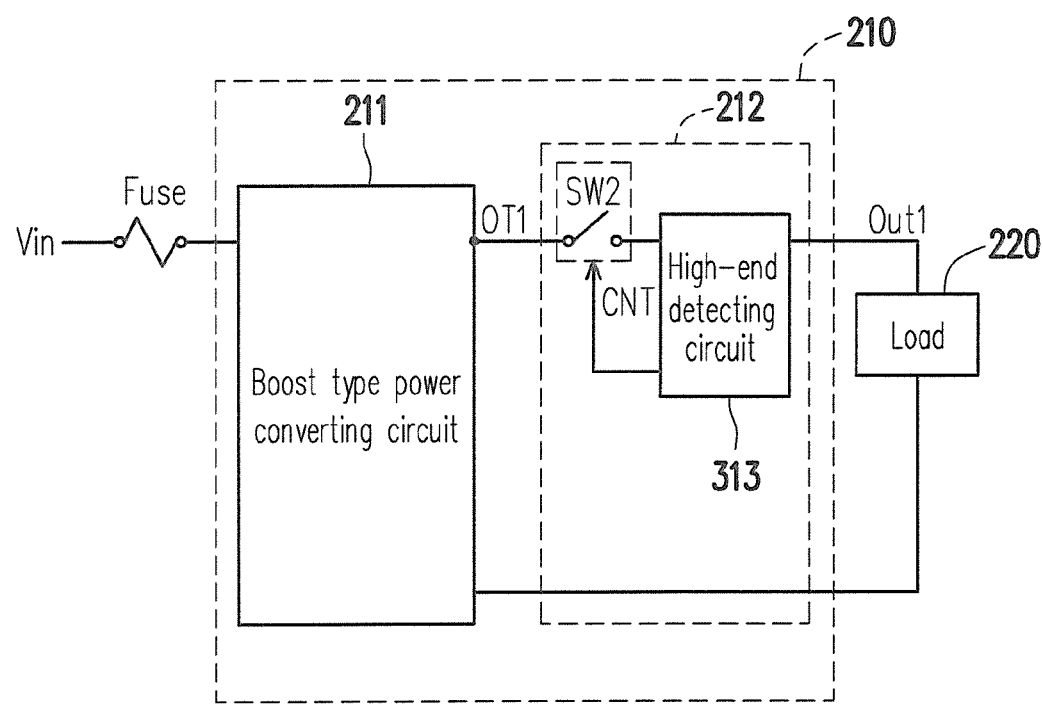
FIG. 3A is a diagram illustrating an implementation of a boost type power converting apparatus 210 according to an embodiment of the invention.

Referring to FIG. 3A, FIG. 3A is a diagram illustrating an implementation of the boost type power converting apparatus 210 according to an embodiment of the invention. The protection circuit 212 includes a high-end detecting circuit 313 and a switch module SW2. The high-end detecting circuit 313 is coupled to the load 220, and generates a control signal CNT according to the output signal Out1. The switch module SW2 is coupled between the high-end detecting circuit 313 and the output terminal OT1 of the boost type power converting circuit 211, and is turned on or off according to the control signal CNT.

Further, when the output signal Out1 is shorted to a ground voltage GND, the output signal Out1 is decreased sharply. When the high-end detecting circuit 313 detects that the output signal Out1 is decreased sharply, the high-end detecting circuit 313 sends the control signal CNT to turn off the switch module SW2 to cut off the electrical loop formed between the boost type power converting circuit 211 and the load 212.

To fully convey operation details of the boost type power converting apparatus 210 shown in FIG. 3A to those skilled in the art, two different circuit implementations are provided below for further descriptions.

Figure 3B:
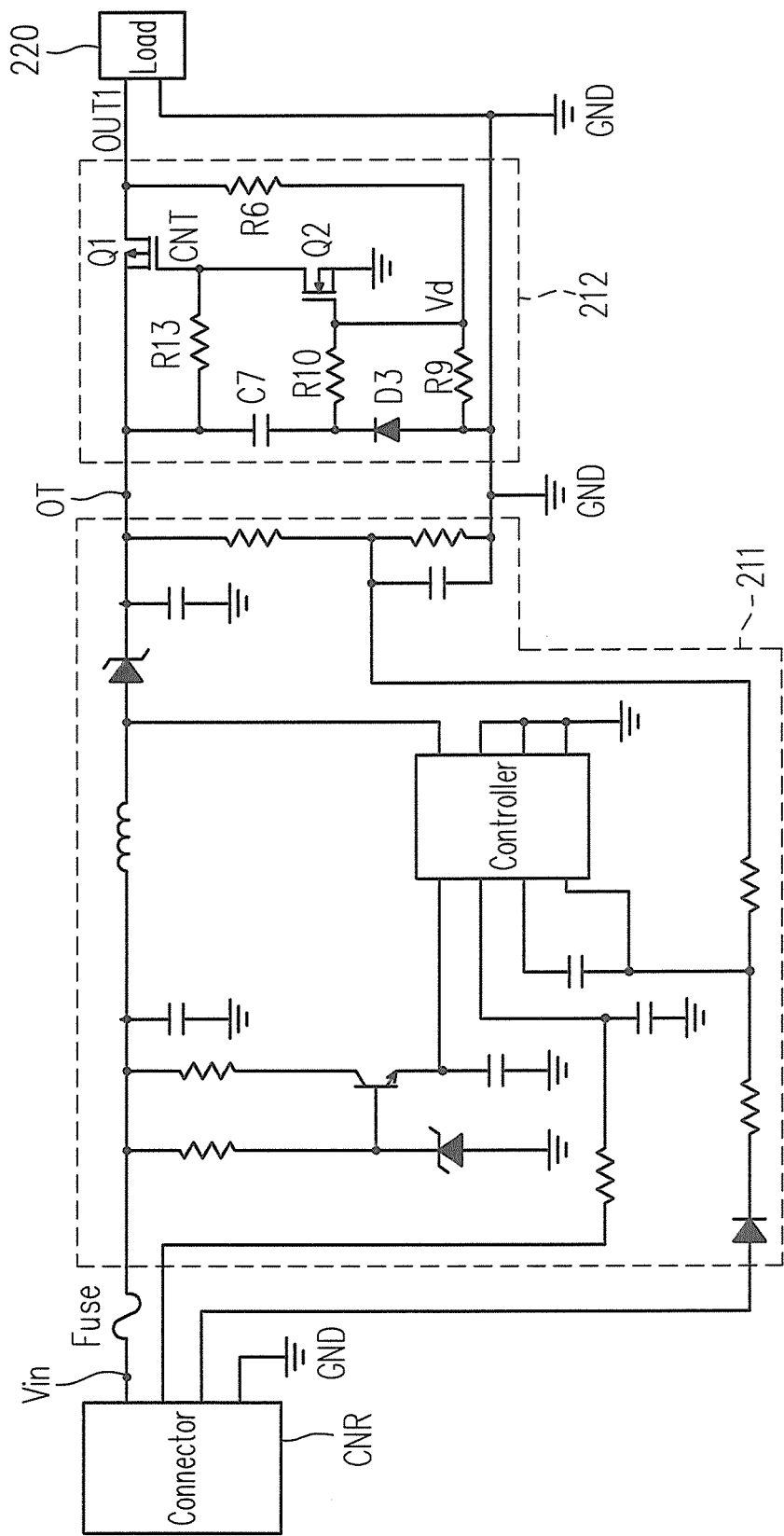
FIG. 3B is a circuit schematic diagram of a boost type power converting apparatus 210 of FIG. 3A.

Referring to FIG. 3B, FIG. 3B is a circuit schematic diagram of the boost type power converting apparatus 210 of FIG. 3A. The boost type power converting circuit 211 receives the input voltage Vin from a connector CNR. The protection circuit 212 includes a high-end detecting circuit formed by a transistor Q2, resistors R6, R9, R10, R13 and a diode D3, and a switch module formed by a transistor Q1. Wherein, the resistors R6 and R9 form a voltage-dividing circuit and are coupled between the output terminal OUT1 of the boost type power converting circuit 211 and the ground voltage GND. The resistor R13 is coupled between a first terminal of the transistor Q2 and the output terminal OT of the boost type power converting circuit 211, and a capacitor C7 is coupled between the resistors R13 and R10. The resistor R10 is connected between the capacitor C7 and a control terminal of the transistor Q2.

An end of the resistor R6 that is coupled to the load 220 receives the output signal Out1, and the voltage-dividing circuit formed by the resistors R6 and R9 divides the output signal Out1 to generate a voltage-divided signal Vd, and then the voltage-divided signal Vd is transmitted to the control terminal of the transistor Q2 (i.e. a gate of the transistor Q2).

During a normal operation (the short-circuit phenomenon is not occurred), the output signal Out1 has a high voltage value, and the switch device Q2 (wherein the switch device can be a metal-oxide-semiconductor field-effect transistor (MOSFET), a transistor or an integrated circuit device, and in the present embodiment, a N-type MOSFET is taken as an example) is turned on by receiving the high-voltage voltage-divided signal Vd. Therefore, the ground voltage GND is transmitted to a control terminal (i.e. a gate) of the switch device Q1 (wherein the switch device can be a metal-oxide-semiconductor field-effect transistor (MOSFET), a transistor or an integrated circuit device, and in the present embodiment, a P-type MOSFET is taken as an example) through the transistor Q2, so as to turn on the transistor Q1.

When the output signal Out1 is sharply decreased due to the short-circuit phenomenon, the transistor Q2 is turned off in response to the voltage-divided signal Vd decreased along with the output signal Out1. Now, the control terminal of the transistor Q1 no longer receives the ground voltage GND, and is pulled high to a high voltage through the resistor R13, so that the transistor Q1 is turned off to cut off the electrical loop. Moreover, the capacitor C7 is charged to provide a high voltage to the control terminal of the transistor Q1, so as to cut off the electrical loop.

Figure 3C:
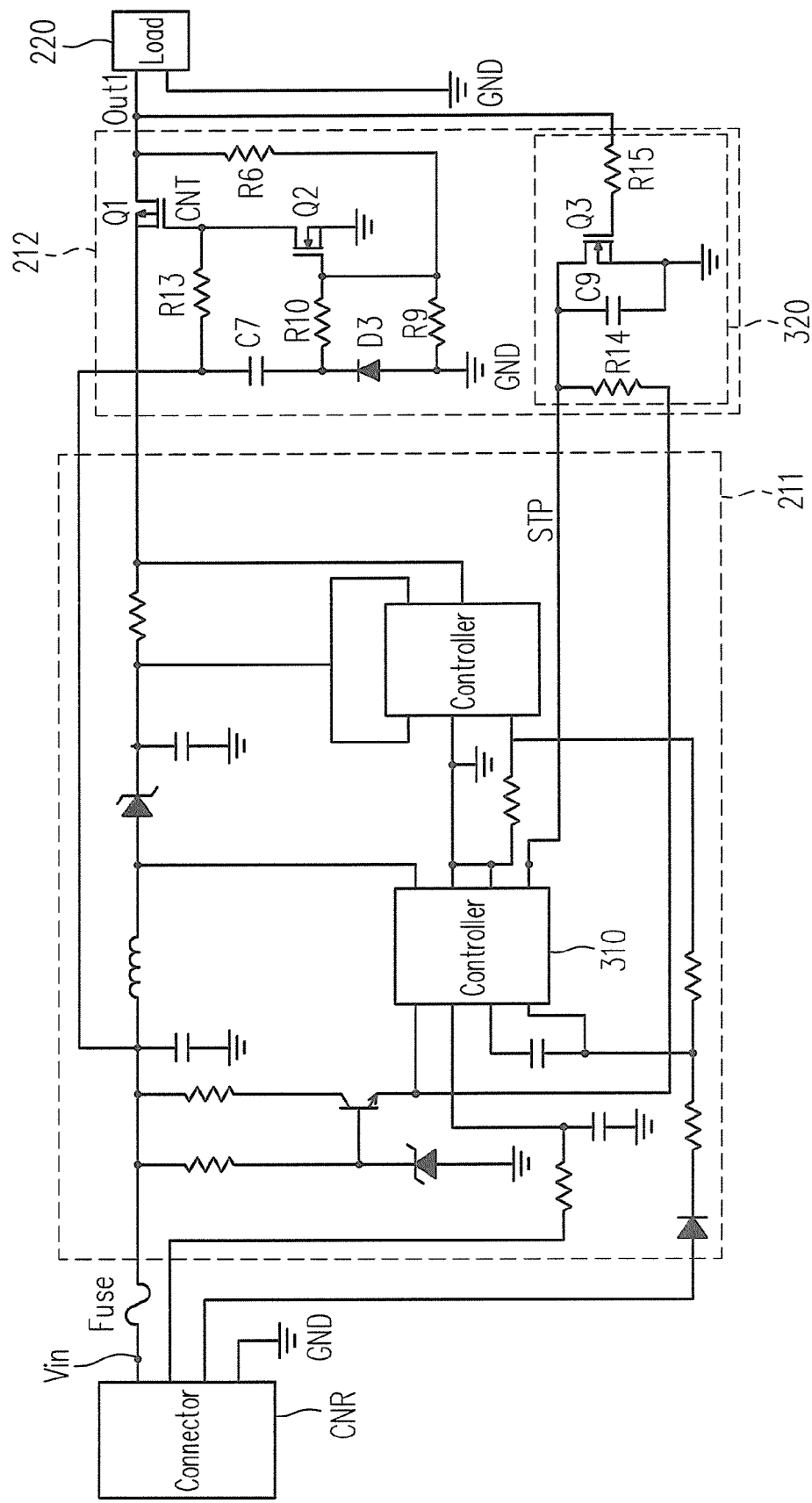
FIG. 3C is another circuit schematic diagram of a boost type power converting apparatus 210 of FIG. 3A.

Referring to FIG. 3C, FIG. 3C is another circuit schematic diagram of the boost type power converting apparatus 210 of FIG. 3A. In FIG. 3C, the boost type power converting circuit 211 receives the input voltage Vin from the connector CNR. The protection circuit 212 further includes a pulse width modulation (PWM) signal stop circuit 320. The PWM signal stop circuit 320 is coupled to the load 220 and the boost type power converting circuit 211, and generates a stop signal STP according to the output signal Out1, and transmits the stop signal STP to the boost type power converting circuit 211 to disable a PWM signal generated in the boost type power converting circuit 211. Wherein, the PWM signal stop circuit 320 includes a transistor Q3, resistors R15, R14 and a capacitor C9. When the short-circuit phenomenon is occurred, the transistor Q3 (which is, a N-type MOSFET) is turned off due to that a control terminal thereof receives a low voltage through the resistor R15. Now, the capacitor C9 is charged through the resistor R14, so that the stop signal STP may have a high level. A controller 310 receives the high-level stop signal STP, and disables the PWM signal generated in the controller 310.

According to the above operations, when the short-circuit phenomenon is occurred, and the electrical loop is cut off, none feedback current can be used for determining occurrence of the PWM signal in the boost type power converting circuit 211 due to that the electrical loop is cut off, so that a miss operation phenomenon is occurred. Therefore, by using the PWM signal stop circuit 320 to cut off the electric loop, and simultaneously disable the PWM signal, the above miss operation phenomenon is eliminated.

Figure 4A:
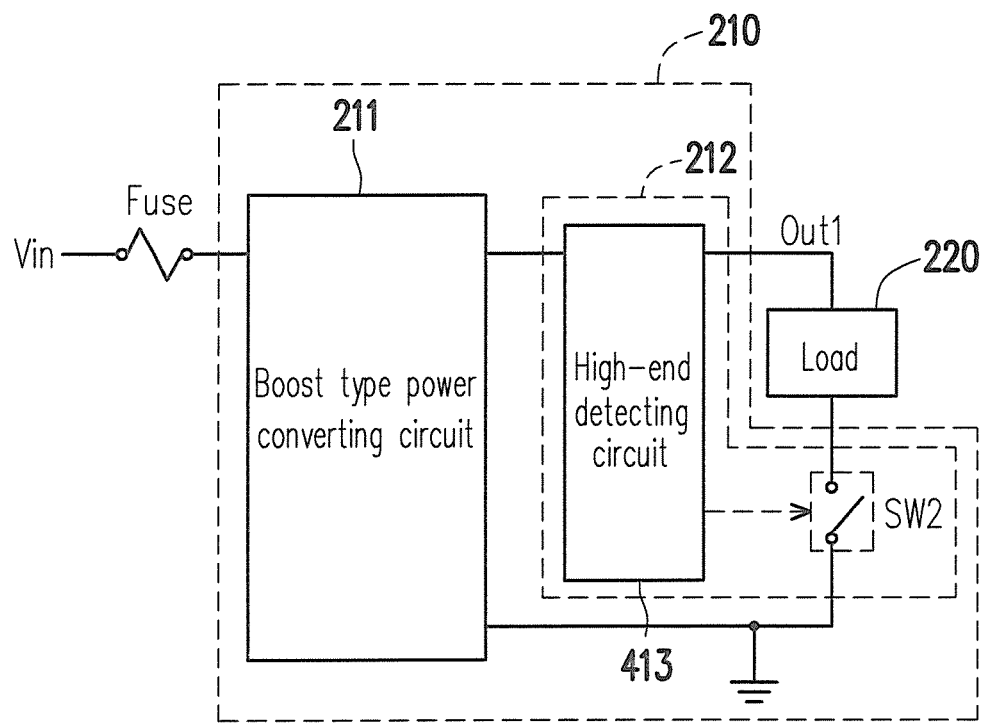
FIG. 4A is a diagram illustrating another implementation of a boost type power converting apparatus 210 according to an embodiment of the invention.

Referring to FIG. 4A, FIG. 4A is a diagram illustrating another implementation of the boost type power converting apparatus 210 according to an embodiment of the invention. The protection circuit 212 includes a high-end detecting circuit 413 and a switch module SW2. Different to the above embodiment, the switch module SW2 of the present embodiment is coupled between the load 220 and the ground voltage GND. When the short-circuit phenomenon is occurred, the switch module SW2 is turned off in response to the PWM signal transmitted from the boost type power converting circuit 211, so as to cut off the electrical loop.

Similarly, to fully convey operation details of the boost type power converting apparatus 210 shown in FIG. 4A to those skilled in the art, a circuit implementation thereof is provided below for further descriptions.

Figure 4B:
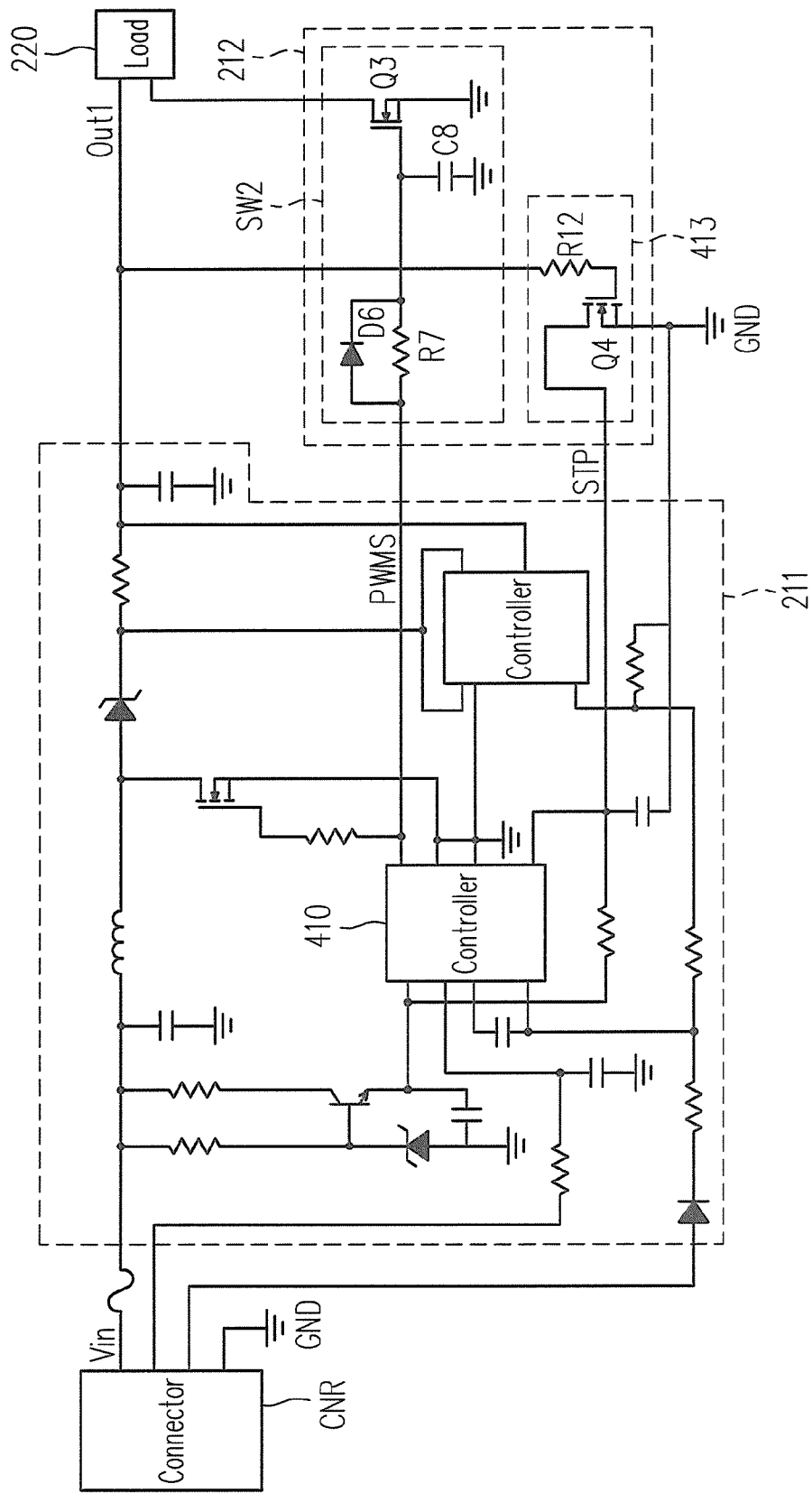
FIG. 4B is a circuit schematic diagram of a boost type power converting apparatus 210 of FIG. 4A.

Referring to FIG. 4B, FIG. 4B is a circuit schematic diagram of the boost type power converting apparatus 210 of FIG. 4A. The boost type power converting circuit 211 receives the input voltage Vin from the connector CNR. The high-end detecting circuit 413 includes a resistor R12 and a transistor Q4. A control terminal (a gate) of the transistor Q4 receives the output signal Out1 through the resistor R12. A first terminal of the transistor Q4 generates the stop signal STP, and a second terminal thereof is coupled to the ground voltage GND. The switch module SW2 includes a transistor Q3 and a delay circuit formed by a resistor R7 and a capacitor C8. One end of the resistor R7 receives a PWM signal PWMS from the boost type power converting circuit 211, and another end thereof is coupled to a control terminal of the transistor Q3.

During a normal operation, the PWM signal PWMS normally functions, and the capacitor C8 is quickly charged through a diode D6, though it is discharged through the resistor R7, so that the discharging speed is relatively slow. Due to a principle of quick charging and slow discharging, the capacitor C8 is charged to a high level. Therefore, the transistor Q3 is maintained to a turn-on state. When the short-circuit phenomenon is occurred, the transistor Q4 is turned off due to that the output signal Out1 received by the control terminal thereof is sharply decreased, and comparatively the stop signal STP is pulled up to a high level, so that the controller 410 stops generating the PWM signal PWMS (the PWM signal PWMS is equal to the ground voltage GND). Meanwhile, since the delay circuit invariably receives the ground voltage GND, a voltage of the control terminal of the transistor Q3 is accordingly decreased to the ground voltage GND, so that the transistor Q3 is turned off (i.e. the electrical loop is cut off).

Figure 5A:
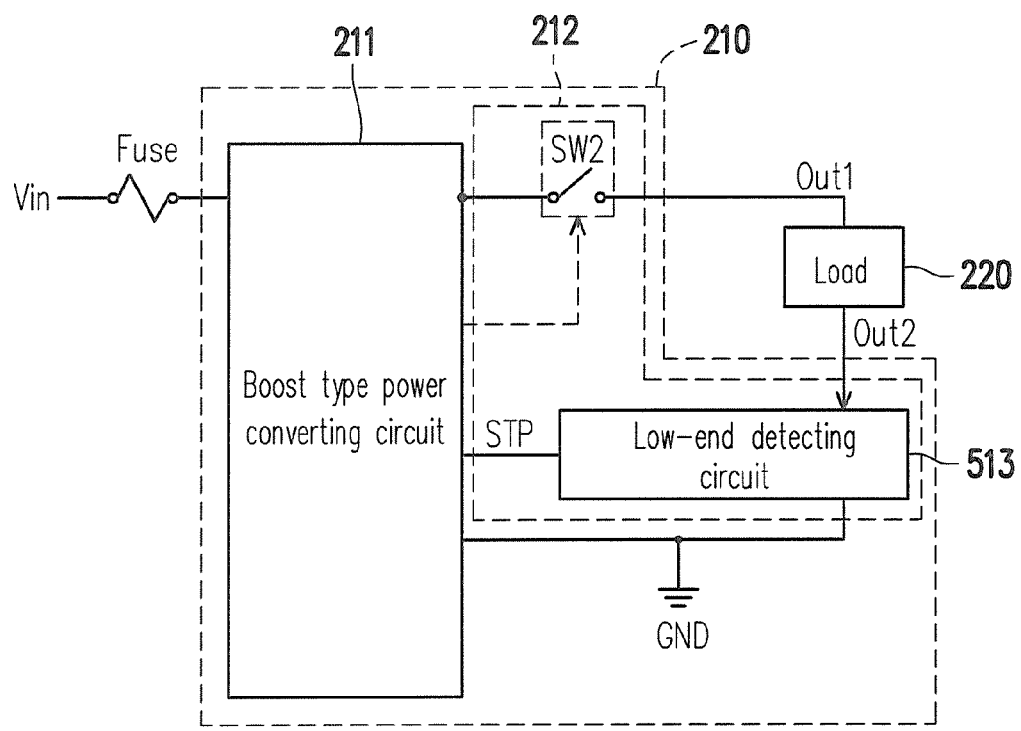
FIG. 5A is a diagram illustrating still another implementation of a boost type power converting apparatus 210 according to an embodiment of the invention.

Referring to FIG. 5A, FIG. 5A is a diagram illustrating still another implementation of the boost type power converting apparatus 210 according to an embodiment of the invention. The protection circuit 212 includes a low-end detecting circuit 513 and a switch module SW2. Different to the aforementioned embodiment, in the present embodiment, the low-end detecting circuit 513 is used to detect the short-circuit phenomenon. The low-end detecting circuit 513 is coupled between the load 220 and the ground voltage GND, and detects whether the short-circuit phenomenon is occurred according to an output signal Out2 passing through the load 220. When the short-circuit phenomenon is occurred, the low-end detecting circuit 513 disables the PWM signal generated in the boost type power converting circuit 211 through the stop signal STP. The switch module SW2 is connected between the boost type power converting circuit 211 and the load 220, and is turned on or off according to whether or not the PWM signal is disabled. In brief, when the PWM signal is disabled, the switch module SW2 is accordingly turned off, and when the PWM signal is enabled, the switch module SW2 is accordingly turned on.

To fully convey operation details of the boost type power converting apparatus 210 shown in FIG. 5A to those skilled in the art, a circuit implementation thereof is provided below for further descriptions.

Figure 5B:
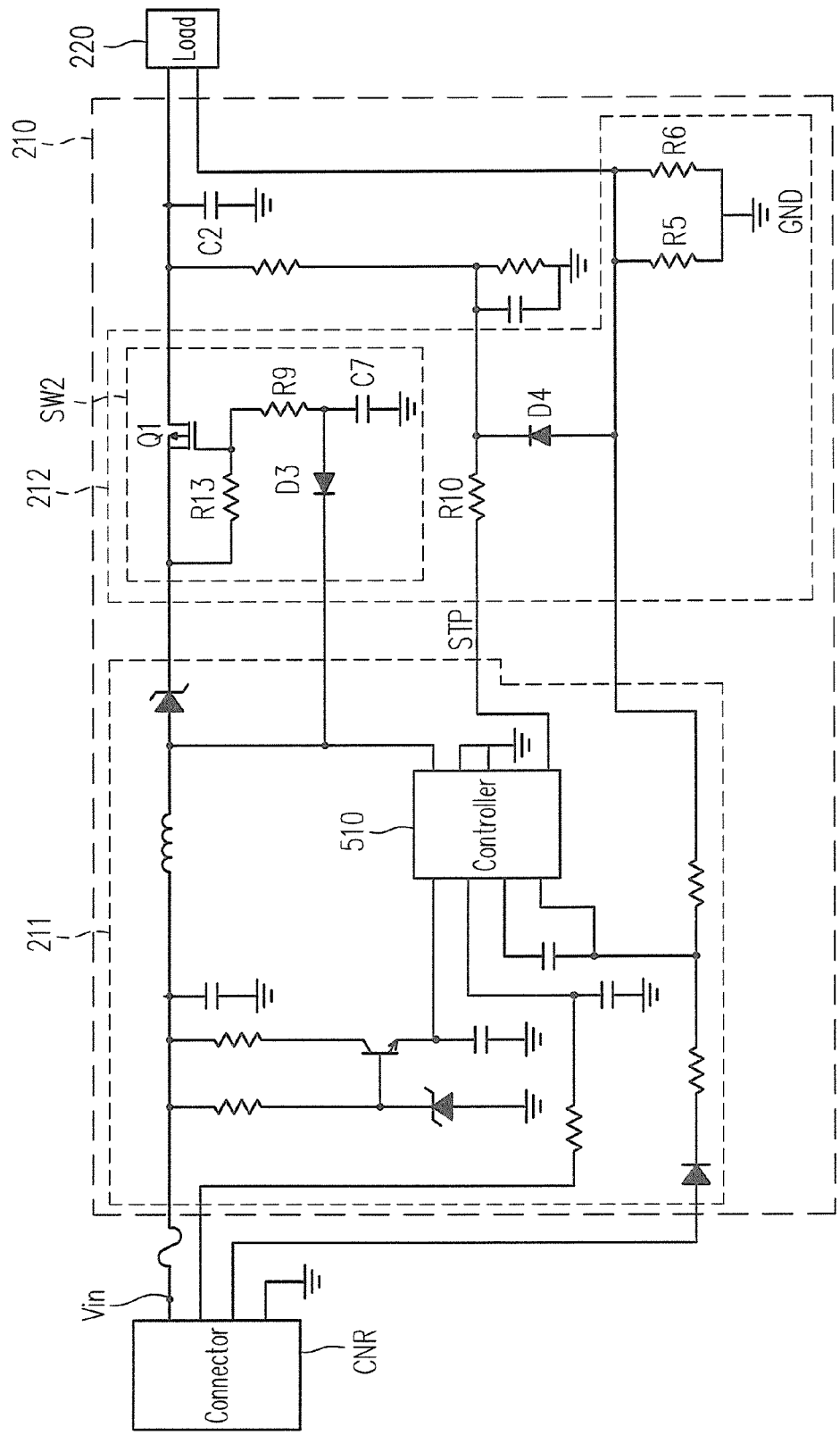
FIG. 5B is a circuit schematic diagram of a boost type power converting apparatus 210 of FIG. 5A.

Referring to FIG. 5B, FIG. 5B is a circuit schematic diagram of the boost type power converting apparatus 210 of FIG. 5A. The boost type power converting circuit 211 receives the input voltage Vin from the connector CNR. The low-end detecting circuit includes resistors R5, R6, R10 and a diode D4, wherein the resistors R5 and R6 are respectively connected between the load 220 and the ground voltage GND, and the diode D4, the resistors R5 and R6 and the load 220 are commonly coupled to transmit the stop signal STP. The switch module SW2 includes a transistor Q1, resistors R13 and R9, a capacitor C7 and a diode D3. A first terminal of the transistor Q1 is coupled to the boost type power converting circuit 211, and a second terminal thereof is coupled to the load 220. The resistor R13 is coupled between the first terminal and a control terminal of the transistor Q1, the resistor R9 and the capacitor C7 are coupled between the control terminal of the transistor Q1 and the ground voltage GND, and an anode of the diode D3 is coupled to a coupling terminal between the resistor R9 and the capacitor C7.

During a normal operation (i.e. the short-circuit phenomenon is not occurred), a quick discharging of the capacitor C7 through the diode D3 makes a voltage of the control terminal of the transistor Q1 to be in a low level. Namely, the transistor Q1 is maintained to a turn-on state. Conversely, when the short-circuit phenomenon is occurred, a large short-circuit current is generated on the load 220. When the large short-circuit current flows through the resistors R5 and R6, a large voltage is generated on a coupling terminal between the resistors R5 and R6 and the load 220. Such voltage may produce a high-voltage stop signal STP through the diode D4 and the resistor R10. Meanwhile, a controller 510 receives the high-voltage stop signal STP, and correspondingly disables the PWM signal generated in the boost type power converting circuit 211. Now, the controller 510 outputs the PWM signal with a high level to a cathode of the diode D3. Comparatively, the voltage received by the control terminal of the transistor Q1 is accordingly increased, so that the transistor Q1 is turned off.

Figure 6A:
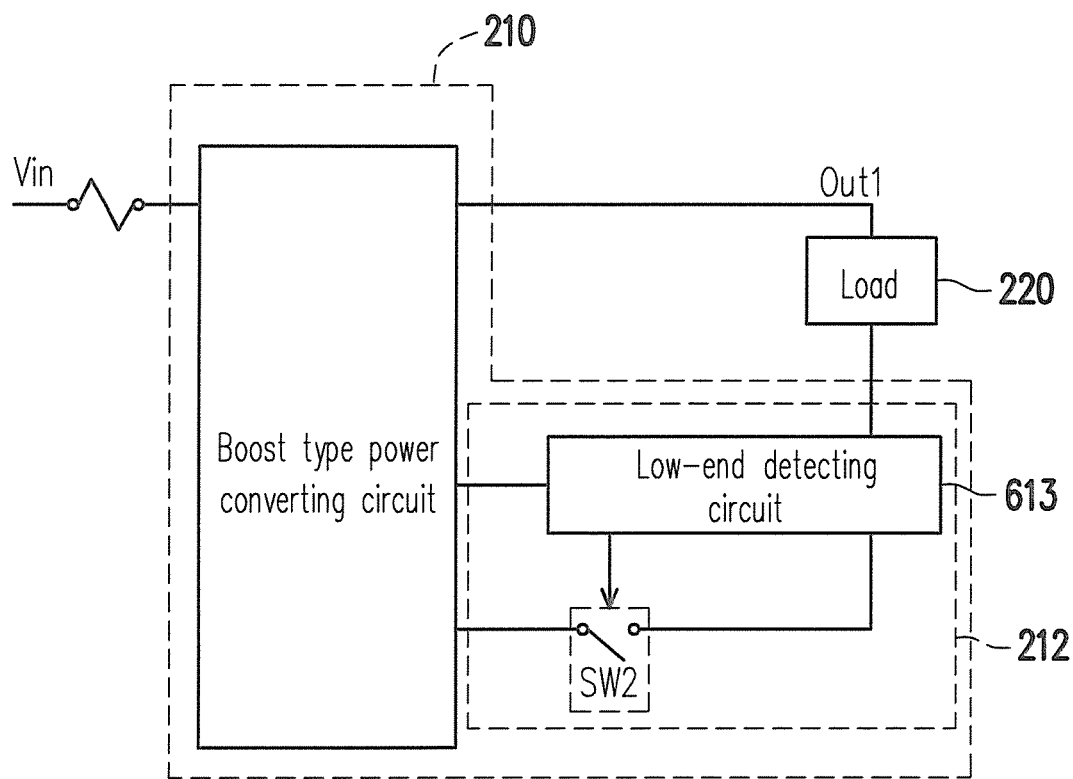
FIG. 6A is a diagram illustrating yet another implementation of a boost type power converting apparatus 210 according to an embodiment of the invention.

Referring to FIG. 6A, FIG. 6A is a diagram illustrating yet another implementation of the boost type power converting apparatus 210 according to an embodiment of the invention. The protection circuit 212 includes a low-end detecting circuit 613 and a switch module SW2. Different to the embodiment of FIG. 5A, the switch module SW2 is coupled between the load 220 and the ground voltage GND. When the short-circuit phenomenon is occurred, the switch module SW2 is turned off to cut off the electrical loop.

To fully convey operation details of the boost type power converting apparatus 210 shown in FIG. 6A to those skilled in the art, a circuit implementation thereof is provided below for further descriptions.

Figure 6B:
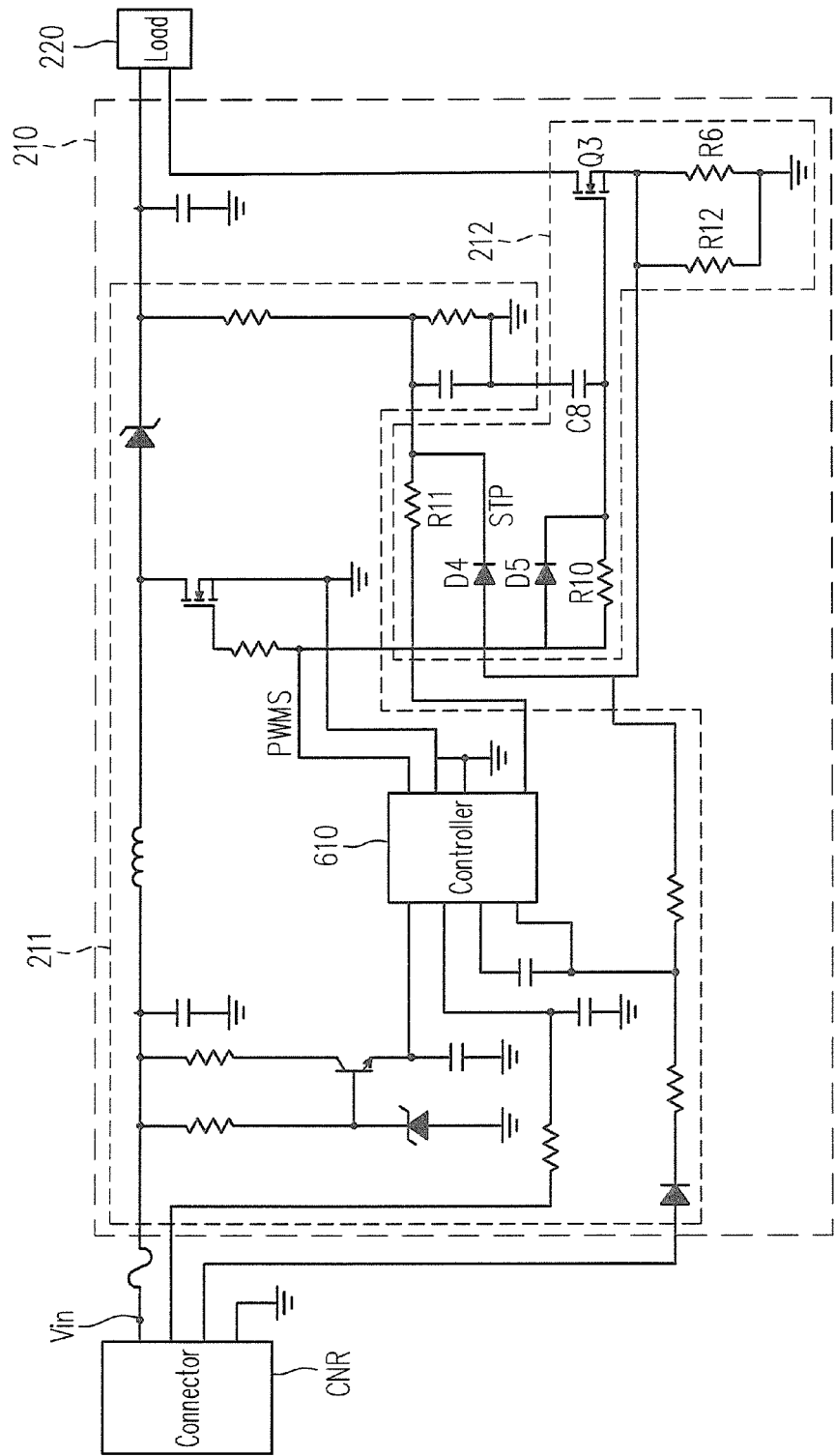
FIG. 6B is a circuit schematic diagram of a boost type power converting apparatus 210 of FIG. 6A.

Referring to FIG. 6B, FIG. 6B is a circuit schematic diagram of the boost type power converting apparatus 210 of FIG. 6A. The boost type power converting circuit 211 receives the input voltage Vin from the connector CNR. Moreover, the low-end detecting circuit includes resistors R12 and R6, a diode D4 and a resistor R11. The resistors R12 and R6 are respectively coupled between the switch module and the ground voltage GND. An anode of the diode D4 and the resistors R12 and R6 are commonly coupled, and a cathode thereof produces the stop signal STP. The switch module includes a transistor Q3, a diode D5 and a resistor R10. A first terminal of the transistor Q3 is coupled to the load 220, and a second terminal thereof is coupled to the resistors R12 and R6. An anode of the diode D5 receives the PWM signal PWMS, and a cathode thereof is coupled to a control terminal of the transistor Q3. The resistor R10 and the diode D5 are connected in parallel.

During a normal operation (i.e. the short-circuit phenomenon is not occurred), the capacitor C8 rapidly establishes a high-voltage level due to a high voltage (a positive pulse width) of the PWM signal PWMS, and provides a high voltage to the control terminal of the transistor Q3 through the diode D5. Therefore, the transistor Q3 is turned on. When the PWM signal PWMS has a low voltage, since a value of the resistor R10 is great enough, the high voltage of the control terminal of the transistor Q3 is not immediately disappeared. Namely, the transistor Q3 can be maintained to the turn-on state. When the short-circuit phenomenon is occurred, a voltage of a coupling terminal of the resistors R12, R6 and the load 220 is increased due to a large short-circuit current. Such increased voltage may produce a high-voltage stop signal STP through the diode D4 and the resistor R11. A controller 610 receives the high-voltage stop signal STP, and correspondingly disables the PWM signal (makes the PWM signal PWMS to be equal to the ground voltage GND). Meanwhile, the capacitor C8 is discharged to a low voltage, namely, the voltage received by the control terminal of the transistor Q3 is decreased, so that the transistor Q1 is turned off.

In summary, in the invention, by detecting a short-circuit phenomenon of a load end, the electrical loop formed between the boost type power converting circuit and the load is cut off, so as to automatically detects an over voltage state or an over current state of the boost type power converting apparatus, and accordingly protect the circuit devices therein.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A boost type power converting apparatus, comprising:
   a boost type power converting circuit, having an output terminal, receives an input voltage and generates an output signal at the output terminal according to the input voltage, the boost type power converting circuit outputs the output signal to a load; and
   a protection circuit, coupled between the boost type power converting circuit and the load to form an electrical loop, and turning on or turning off the electrical loop according to the output signal, wherein the protection circuit comprises:
      a high-end detecting circuit, coupled to the load and the boost type power converting circuit, for receiving the output signal and accordingly generating a stop signal according to the output signal, and transmitting the stop signal to the boost type power converting circuit to disable a pulse width modulation (PWM) signal generated in the boost type power converting circuit; and
      a switch module, coupled between the load and a ground voltage in series, and coupled to the boost type power converting circuit, for receiving the PWM signal, and being turned on or off according to the PWM signal.

2. The boost type power converting apparatus as claimed in claim 1, wherein the high-end detecting circuit comprises:
   a first transistor, having a control terminal for receiving the output signal, a first terminal for generating the stop signal, and a second terminal being coupled to the ground voltage.

3. The boost type power converting apparatus as claimed in claim 2, wherein the switch module comprises:
   a delay circuit, having an input terminal coupled to the boost type power converting circuit for receiving the PWM signal; and
   a second transistor, having a control terminal coupled to an output terminal of the delay circuit, a first terminal coupled to the load, and a second terminal coupled to the ground voltage.

4. A boost type power converting apparatus, comprising:
   a boost type power converting circuit, having an output terminal, receives an input voltage and generates an output signal at the output terminal according to the input voltage, the boost type power converting circuit outputs the output signal to a load; and
   a protection circuit, coupled between the boost type power converting circuit and the load to form an electrical loop, and turning on or turning off the electrical loop according to the output signal, wherein the protection circuit comprises:
- a low-end detecting circuit, coupled to the load and a ground voltage, for receiving the output signal passing through the load and generating a stop signal according to the output signal, and transmitting the stop signal to the boost type power converting circuit to disable a pulse-width modulation (PWM) signal generated in the boost type power converting circuit; and
- a switch module, coupled between the boost type power converting circuit and the load in series, the switch module being turned on or turned off according to the PWM signal.

5. The boost type power converting apparatus as claimed in claim 4, wherein the low-end detecting circuit comprises:
- a first resistor, coupled between the load and the ground voltage in series; and
- a first diode, having an anode and a cathode, the anode of the first diode coupled to the ground voltage, a first resistor and the load being commonly coupled for transmitting the stop signal.

6. The boost type power converting apparatus as claimed in claim 5, wherein the switch module comprises:
- a transistor, having a first terminal coupled to the boost type power converting circuit, and a second terminal coupled to the load;
- a second resistor, coupled between the first terminal and a control terminal of the transistor in series;
- a third resistor, having one end coupled to the control terminal of the transistor;
- a second diode, having an anode coupled to another end of the third resistor, and a cathode generating the stop signal; and
- a capacitor, coupled between the other end of the third resistor and the ground voltage.

7. A boost type power converting apparatus, comprising:
- a boost type power converting circuit, having an output terminal, receives an input voltage and generates an output signal at the output terminal according to the input voltage, the boost type power converting circuit outputs the output signal to a load; and
- a protection circuit, coupled between the boost type power converting circuit and the load to form an electrical loop, and turning on or turning off the electrical loop according to the output signal, wherein the protection circuit comprises:
  - a low-end detecting circuit, coupled to the load and a ground voltage, for receiving the output signal passing through the load and accordingly generating a stop signal according to the output signal, and transmitting the stop signal to the boost type power converting circuit to disable a pulse-width modulation (PWM) signal generated in the boost type power converting circuit; and
  - a switch module, coupled between load and a ground voltage, and being turned on or off according to the PWM signal.

8. The boost type power converting apparatus as claimed in claim 7, wherein the low-end detecting circuit comprises:
- a first resistor, coupled between the switch module and the ground voltage in series; and
- a first diode, having an anode coupled to the first resistor and the switch module, and a cathode generating the stop signal.

9. The boost type power converting apparatus as claimed in claim 8, wherein the switch module comprises:
- a transistor, having a first terminal coupled to the load, and a second terminal coupled to the ground voltage;
- a second diode, having an anode receiving the PWM signal, and a cathode coupled to a control terminal of the transistor; and
- a second resistor, coupled to the second diode in parallel.

* * * * *